United States Patent
Lim et al.

(10) Patent No.: US 9,134,899 B2
(45) Date of Patent: Sep. 15, 2015

(54) TOUCH GESTURE INDICATING A SCROLL ON A TOUCH-SENSITIVE DISPLAY IN A SINGLE DIRECTION

(75) Inventors: Yu-Xi Lim, Lynnwood, WA (US); Philomena Lobo, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1124 days.

(21) Appl. No.: 13/046,806

(22) Filed: Mar. 14, 2011

(65) Prior Publication Data

US 2012/0240041 A1    Sep. 20, 2012

(51) Int. Cl.
G06F 3/0485    (2013.01)
G06F 3/0488    (2013.01)

(52) U.S. Cl.
CPC .......... G06F 3/04883 (2013.01); G06F 3/0485 (2013.01)

(58) Field of Classification Search
CPC ... G06F 3/04883; G06F 3/017; G06F 3/0488; G06F 3/0485; H04M 2250/22; H04M 1/72561
USPC .................................................. 715/784, 863
See application file for complete search history.

(56) References Cited

U.S. PATENT DOCUMENTS

| | | | |
|---|---|---|---|
| 5,038,138 A | 8/1991 | Akiyama et al. | |
| 7,061,474 B2 | 6/2006 | Hinckley | |
| 7,173,637 B1 | 2/2007 | Hinckley | |
| 7,193,609 B2 * | 3/2007 | Lira | 345/157 |
| 7,202,857 B2 | 4/2007 | Hinckley et al. | |
| 7,519,920 B2 | 4/2009 | Jarrett et al. | |
| 7,609,253 B2 | 10/2009 | Trent, Jr. | |
| 7,614,019 B2 * | 11/2009 | Rimas Ribikauskas et al. | 715/863 |
| 7,764,274 B2 | 7/2010 | Westerman et al. | |
| 7,817,145 B2 | 10/2010 | Klishko et al. | |

(Continued)

FOREIGN PATENT DOCUMENTS

| CN | 1221909 A | 7/1999 |
|---|---|---|
| CN | 1670680 A | 9/2005 |

(Continued)

OTHER PUBLICATIONS

"Razer DeathAdder™ Gaming Mouse", Retrieved at << http://www.tru3d.com/products/view_product.php?id=30336&Product=Razer%20DeathAdder%20%99%20Gaming%20Mouse >>, Retrieved Date: Nov. 22, 2010, pp. 4.

(Continued)

*Primary Examiner* — Nicholas Ulrich
(74) *Attorney, Agent, or Firm* — Aneesh Mehta; Kate Drakos; Micky Minhas

(57) ABSTRACT

A method of operating a device having a touch-sensitive display includes displaying scrollable information elements on the touch-sensitive display and detecting a touch gesture from an input device on the touch-sensitive display. The touch gesture is classified as a flick gesture. If the flick gesture satisfies at least a first criterion reflecting a user intent to scroll the information elements in a single direction along a first of a pair of cardinal axes, the direction in which the information elements is scrolled is locked along the single direction. If the flick gesture satisfies the first criterion, any displacement of the information elements which has occurred along a second of the cardinal axes orthogonal to the first cardinal axis as a result of classifying the touch gesture as a flick gesture is undone.

15 Claims, 7 Drawing Sheets

(56) References Cited

U.S. PATENT DOCUMENTS

| | | |
|---|---|---|
| 8,402,386 B2 | 3/2013 | Hakiel et al. |
| 2002/0051018 A1 | 5/2002 | Yeh |
| 2005/0229117 A1 | 10/2005 | Hullender et al. |
| 2006/0055662 A1* | 3/2006 | Rimas-Ribikauskas et al. ............... 345/156 |
| 2006/0055685 A1 | 3/2006 | Rimas-Ribikauskas et al. |
| 2006/0075357 A1 | 4/2006 | Guido et al. |
| 2006/0209014 A1 | 9/2006 | Duncan et al. |
| 2007/0132789 A1 | 6/2007 | Ording et al. |
| 2007/0146337 A1 | 6/2007 | Ording et al. |
| 2007/0146347 A1* | 6/2007 | Rosenberg ............... 345/173 |
| 2007/0291014 A1 | 12/2007 | Layton et al. |
| 2008/0168384 A1 | 7/2008 | Platzer et al. |
| 2008/0168402 A1* | 7/2008 | Blumenberg ............... 715/863 |
| 2008/0174567 A1 | 7/2008 | Woolley et al. |
| 2008/0282202 A1 | 11/2008 | Sunday |
| 2009/0073194 A1 | 3/2009 | Ording |
| 2009/0265658 A1 | 10/2009 | Klishko et al. |
| 2010/0011316 A1 | 1/2010 | Sar et al. |
| 2010/0058227 A1 | 3/2010 | Danton et al. |
| 2010/0073486 A1 | 3/2010 | Tai |
| 2010/0115458 A1 | 5/2010 | Marano et al. |
| 2010/0134425 A1 | 6/2010 | Storrusten |
| 2010/0138776 A1 | 6/2010 | Korhonen |
| 2010/0201618 A1 | 8/2010 | Lorente |
| 2010/0251116 A1 | 9/2010 | Rimas-Ribikauskas et al. |
| 2011/0043456 A1* | 2/2011 | Rubinstein et al. ............... 345/173 |
| 2011/0302532 A1* | 12/2011 | Missig ............... 715/823 |

FOREIGN PATENT DOCUMENTS

| | | |
|---|---|---|
| CN | 101490643 A | 7/2009 |
| EP | 0 344 672 A1 | 12/1989 |

OTHER PUBLICATIONS

"Multi-Dimensional Auto-Scrolling", U.S. Appl. No. 12/878,924, filed Sep. 9, 2010, pp. 1-30.

Liao, et al., "Pacer: Fine-Grained Interactive Paper via Camera-Touch Hybrid Gestures on a Cell Phone"—Published Date: Apr. 10-15, 2010, Retrieved at: http://www.fxpal.com/publications/FXPAL-PR-10-550.pdf (10 pages total).

"Right-To-Left Text in Markup Languages," Retrieved from: <http://www.il8nguy.com/markup/right-to-left.html>, Retrieved on: Aug. 27, 2010 (4 pages total).

\* cited by examiner

TOUCH GESTURE INDICATING A SCROLL ON A TOUCH-SENSITIVE DISPLAY IN A SINGLE DIRECTION

BACKGROUND

The functionality of many computing systems and other devices relies on effective display of information. More recently, the display has also been used in an interactive manner as a direct input device. For instance, the display might be a touch interface in which an object or finger might be placed in contact with the display to select an item on the display. Additionally, the user might input a gesture onto the display by moving the object in contact with the display in a desired manner. For example, to drag content on the display, the user might move the object from one portion of the display to another.

Computing devices may present lists of items to a user via a scrollable list presented on a display with a touch interface. For lists containing large numbers of items, various methods have been used to allow users to scroll through such lists quickly. For instance, many devices allow a user to use control movement of web page using drag and flick gestures.

Typically a user will want to scroll through content along a cardinal direction (vertically or horizontally) and does so using a series of drag and flick gestures. These gestures are generally not completely horizontal or vertical, especially when the device is small such as a mobile phone, for example. In this case the user may be the operating and holding the phone with one hand and gesturing with a thumb. As result, if the user intends to scroll the content vertically, for instance, the actual gesture may cause a small horizontal drift of the content, eventually pushing the content off the sides of the display. This problem can be addressed by "locking" the direction of motion based on certain thresholds imposed on the gesture, but even these thresholds still may too large to handle certain situations, such as when the user attempts to scroll by performing repeated, small flicking gestures.

SUMMARY

When user scrolls a page on a touch-sensitive display using a finger or other input device, there may be imperfections in the scrolling process on the part of the user. On way to address this imperfection in the scrolling process is to "lock" the direction of the scroll based on thresholds that may be established. Nevertheless, in some cases, particularly when the display resides on a small hand-held device such as a mobile phone, these thresholds may not be adequate to determine that the user's intent is to scroll the page in a single direction. This document describes techniques and apparatuses for employing one or more additional criteria above and beyond the aforementioned thresholds to determine if the user intends to scroll a page in a single direction.

In one implementation, if a touch gesture such as a flick gesture is used to scroll a page, the additional criterion may involve the speed of the flick. Specifically, if the speed exceeds a threshold value, the scrolling of the page will be locked in a single direction. In some implementations the single direction will be a cardinal direction. Moreover, in some cases, when the direction of the scroll is locked in this manner, any displacement of the page in a direction orthogonal to the scrolling direction which has already occurred as a result of the flick gesture will be undone. If the additional criterion or criteria indicate that the flick is not intended by the user to lock the scroll in a single direction, the page will be allowed to be dragged in the direction of the flick.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments described herein relate to the use of gestures to manage displayed content on an interactive display. A computing system that incorporates an interactive display will first be described with respect to FIG. 1. Further embodiments will then be described with respect to FIGS. 2 through 10.

Figure 1:
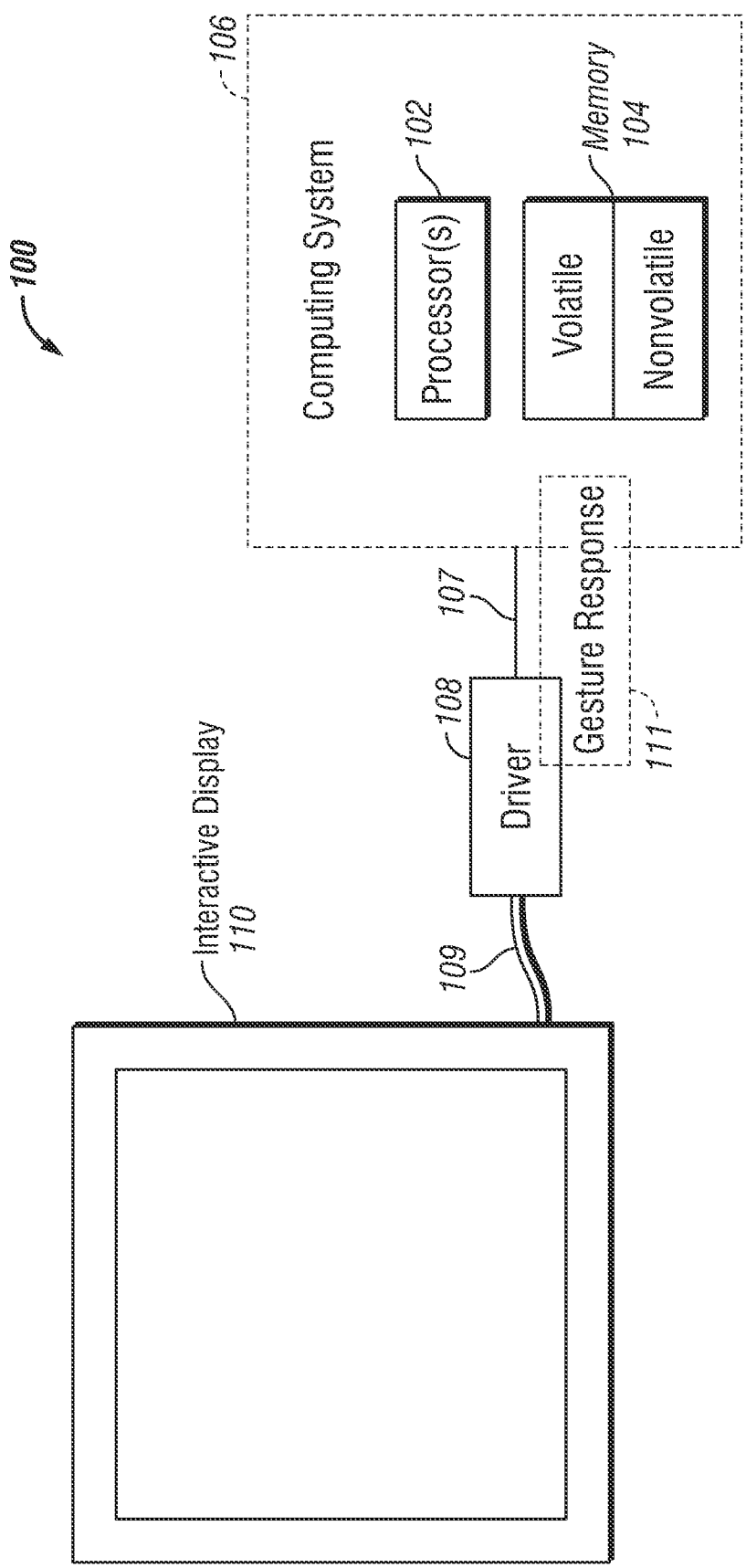
FIG. 1 shows a schematic diagram of an example computing environment in which embodiments described herein may be performed.

FIG. 1 shows a schematic diagram of an example computing environment 100 in which embodiments described herein may be performed. The computing environment includes an interactive display 110, a computing system 106, and a driver 108. As will be described hereinafter, the computing system 106 may be any computing system that includes one or more processors 102 and some type of memory 104. The physical configuration of the interactive display 110 will sometimes depend on the specific physical configuration of the computing system 106. For instance, if the computing system 106 were quite small (say, for example, a PDA or a wristwatch), then the interactive display 110 might also be quite small, although that need not be the case. Similarly, if the computing system 106 were a desktop computer, the interactive display 110 might be larger. The principles of the present invention are not limited to the type of computing system 106, nor to the physical configuration of the interactive display 110.

The driver 108 receives display data from the computing system 106 over connection 107, transforms that data into suitable signals needed to display the corresponding image(s) on the interactive display 110. The driver 108 then sends the transformed signals to the interactive display 110 over connection 109.

Since the display 110 is interactive, the user (which might be a human being or another entity capable of interfacing with the display 110) might enter information into the interactive display 110. For instance, if the interactive display 110 were a touch-sensitive display, a user might use an input device such as a finger, stylus, or other mechanical instrument to contact the interactive display. Alternatively, the interactive display may incorporate image sensing technology in which objects in close proximity to the display may be imaged as input to the system.

The driver 108 receives signals that represent system input from the interactive display 110 perhaps also over connection 109. The driver 108 may then transform those signals into data that may be used and processed by the computing system 106. The driver then sends that data to the computing system perhaps over connection 107.

The computing environment also includes a gesture response mechanism 111. The gesture response mechanism 111 is shown as being abstractly distributed between the driver 108 and the computing system 106. This is done to symbolically represent that some or all of the gesture recognition and response mechanisms described herein may be performed by the driver 108 itself, by the computing system 106, or partly by the driver 108 and partly by the computing system 106. As an alternative, the gesture response mechanism may be partially implemented within the hardware and/or software of the interactive display 110 itself.

The gesture response mechanism 111 may support inertial scrolling to allow a user to quickly browse through long lists. Inertial scrolling is scrolling that continues after completion of the input gesture that causes the scrolling. For example, in the example of a touch-sensitive display, a user may inertially scroll a list by quickly flicking a finger on the display along a direction of scrolling. The acceleration and/or velocity of the input gesture may be used to determine a velocity and duration of list scrolling.

The described computing system 106 is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

In its most basic configuration, a computing system 106 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Figure 2:
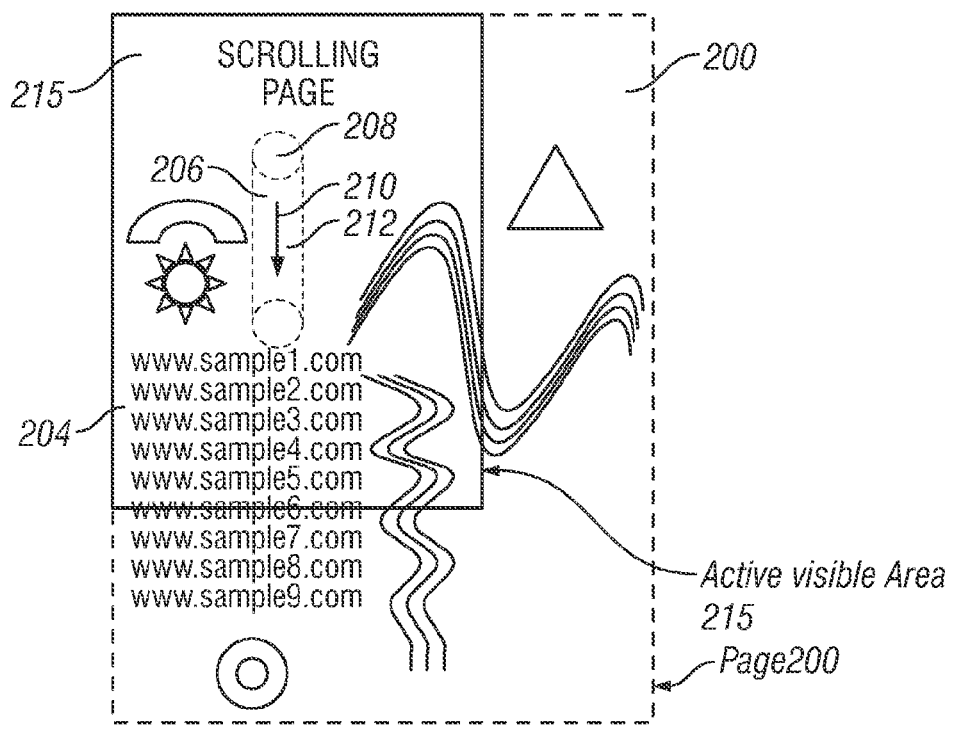
FIG. 2 illustrates an example of a page that may be displayed on the touch-sensitive display.

FIG. 2 illustrates an example of a page 200 that may be displayed on the touch-sensitive display 102. In this example, the page includes a scrollable list of items 204 in the graphical user interface window 200. In FIG. 2, the page 200 is denoted by the dotted rectangle while the active visible area 215 of the page on the display 102 is denoted by the solid rectangle. Thus, in this example, the active visible area 215 is smaller than the page 200 so that only a portion of the page 200 may be viewed at any one time.

FIG. 2 also illustrates an example of a touch gesture 206 made over the scrollable list of items or elements 204. Where the scrollable list of items is displayed as illustrated in FIG. 2, a touch gesture performed anywhere on the display may be considered to be over the list of items, and therefore be effective to manipulate the list of items.

Figure 3:
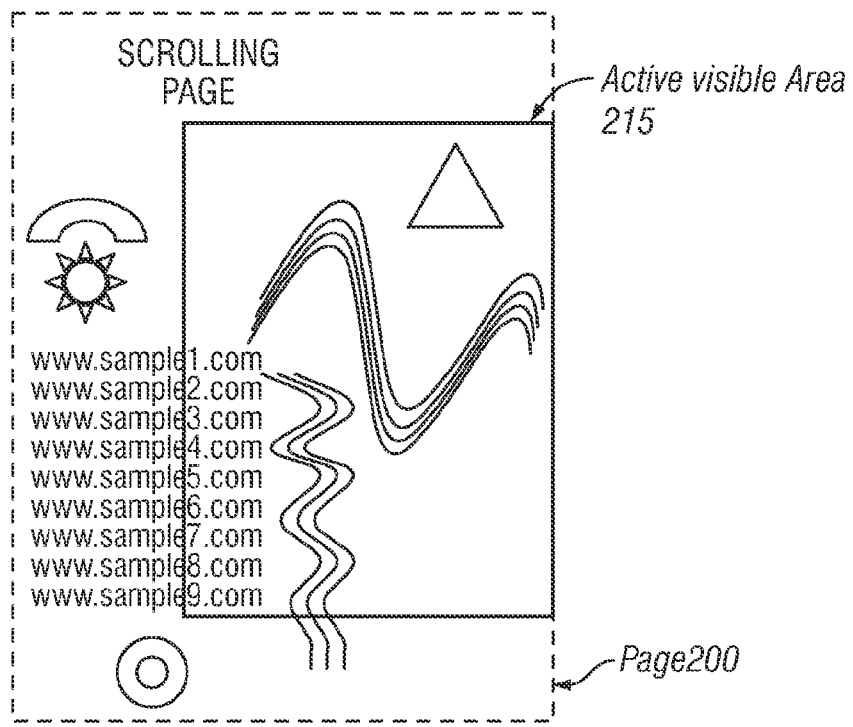
FIG. 3 illustrates the page of FIG. 2 after being scrolled in response to a touch gesture.

To initiate the first touch gesture displayed in FIG. 2, a user may touch the display with one or more fingers (one is illustrated schematically at 208 in FIG. 2) or other input devices, and then move the fingers or other input devices across the touch-sensitive display, as indicated by arrow 210, along a path 212 within a predetermined range of directions. In response to the touch gesture 206, the scrollable list of items 204 on the page 200 is scrolled, as illustrated in FIG. 3, along a same direction as the touch gesture (or a component of the direction of the first touch gesture). Scrolling via the illustrated touch gesture may allow a user to accurately and precisely scroll to specific items in the list of information items 204.

While gesture response mechanism 111 may be configured to detect different types of gestures, the types of touch gestures that will cause a page to be scrolled may generally be characterized as a flick or drag. A flick gesture is detected when the input device (e.g., a finger, hand, stylus, etc.) is positioned on one portion of the display and then moved rapidly towards an edge of the display. The criteria for a flick gesture might include, for example, the length of time that the input device was relatively stationary prior to the flick movement, the relative speed of the input device during the period of being relatively stationary, the speed and direction profile of the movement, the length of the movement, and the like. Of course, these criteria are just example criteria. In any case, one or more criteria may be developed that are representative of a user intent to volitionally move the input device in one direction to thereby imply a user-intentioned flick. The one or more criteria may depend heavily on the type and size of interactive display, and on the type of input device. The criteria might also depend on a variety of other factors such as cultural considerations, experimental user behavior data, and the nature of a displayed object underlying the input device.

A drag gesture may be similar to flick, but may be distinguished from a flick gesture by criteria such as the speed at which the input device moves over the duration of the touch gesture as well as the speed at the end of the touch gesture.

When a page is scrolled, there may be imperfections in the scrolling process on the part of the user. A user may wish to scroll a page vertically, for example, but may be unable to direct the input device in a precisely vertical fashion. Likewise, if a horizontal scroll is desired, the user may be unable to affect a strictly horizontal scroll due to variations in the flick or drag direction. For example, a user may wish to scroll a web page in a downward (vertical) direction. However, if the user drags the page downward and slightly to the side, the page might scroll in a downward direction but the scrolling direction would be skewed to the side in which the user moved the input device. For instance, in FIG. 3 the user intended to scroll downward on page 200 of FIG. 2, but because the scroll was skewed horizontally to the right, the scroll is skewed to the right by a corresponding amount.

On way to address this imperfection in the scrolling process is to "lock" the direction of the scroll based on thresholds that may be established. If the input device stays within the threshold the scroll of the content will be locked in its direction of motion, which is usually one of the cardinal directions. That is, the content will be scrolled in one dimension instead of two dimensions. One example of how such tolerances can be established is illustrated in connection with FIGS. 4 and 5.

Figure 4:
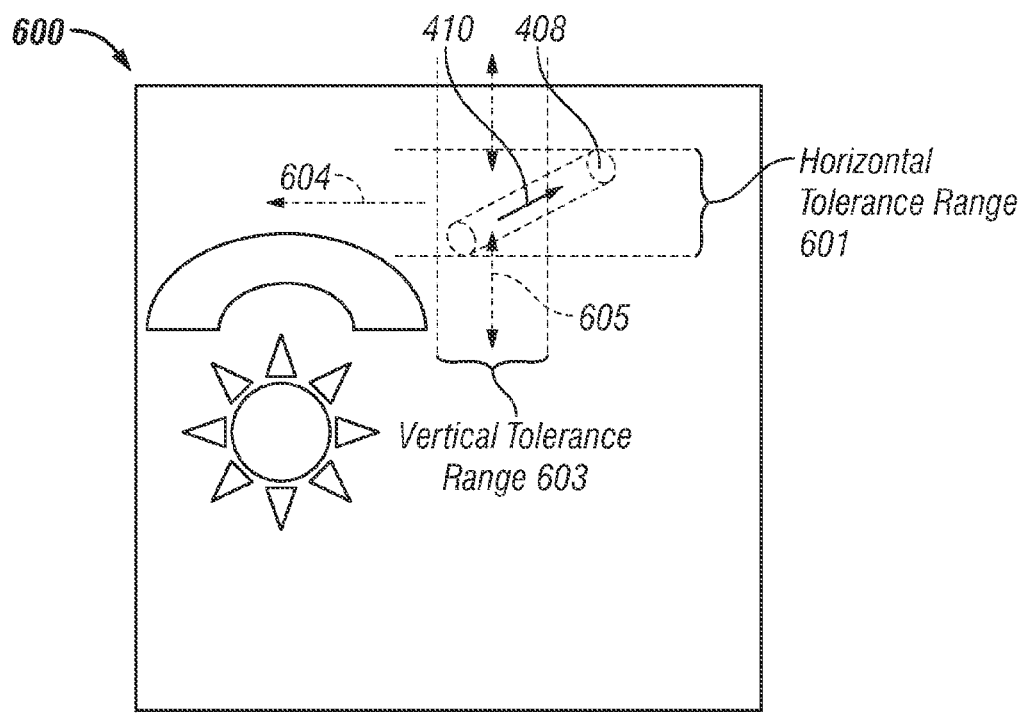
FIG. 4 shows the initial position of an input device on a page presented on a touch-sensitive display
Figure 5:
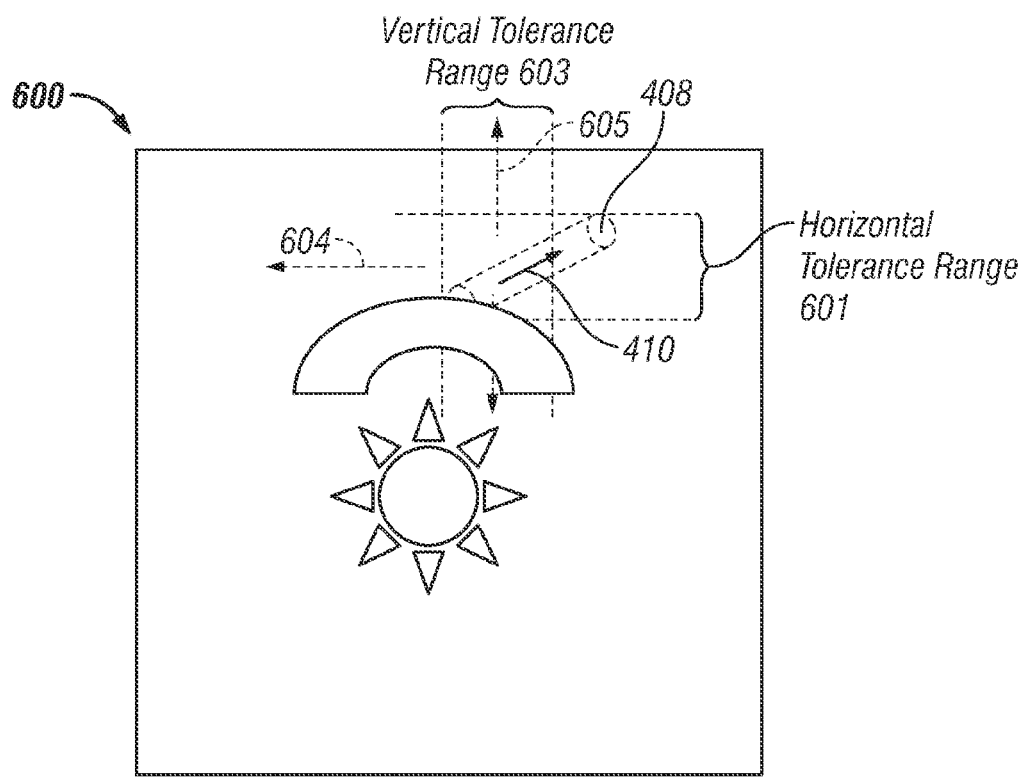
FIG. 5 illustrates the result of scrolling the page of FIG. 4 horizontally in tandem with dragging the input device in a horizontal direction with a vertical skew.

FIGS. 4 and 5 illustrate how a horizontal tolerance range 601 can be applied to the scrolling of displayed information, for example, a page 600. In this example, the page 600 is scrolled in a horizontal direction in tandem with a touch gesture 406 of an input device 408 such as the user's finger. However, in this example the path 412 of the touch gesture 406 is not precisely horizontal. Rather, the touch gesture 406 is moved in a horizontal direction that is slightly skewed from the precise horizontal (i.e., 0 degrees or 180 degrees) direction 604. However, the touch gesture 412 remains within a horizontal tolerance range 601 of the precise horizontal direction 604 from the position of the touch gesture 412.

FIG. 4 demonstrates the initial position of the input device 408 on the page 600. The input device 408 is moved in a horizontal direction toward the right. The movement is intended to be in a precise horizontal direction 604 such that the page 600 is scrolled in a horizontal direction without a vertical skew. FIG. 5 illustrates the result of scrolling the page horizontally in tandem with dragging the input device 408 in a horizontal direction with a vertical skew. As illustrated in FIG. 5, the input device 408 does not follow the path of the precise horizontal direction 604. Rather, the movement of the input device 408 skews upward along path 412. However, the input device 402 remains within a horizontal tolerance range 601 of the precise horizontal direction 604. Thus, the page 600 is scrolled in the precise horizontal direction without a vertical skew even though the input device 408 is moved horizontally with a vertical skew.

The example illustrated in FIGS. 4 and 5 demonstrates precise horizontal biasing of the scrolling of a page 600. In this way, the scrolling of page 600 is locked in a precise horizontal direction 604 even though the direction of motion of the input device 408 deviates from the precise horizontal direction, provided that the input device 408 remains within a predetermined horizontal tolerance range 601.

The locking of the page movement as illustrated in FIGS. 4 and 5 may also be applied in different directions. For example, scrolling of the page in a vertical direction may likewise be biased in the vertical direction if horizontal skew of the input device 408 is within a vertical tolerance range 603. Moreover, any direction of movement of interest may exhibit this feature depending on the needs of the user.

Figure 6:
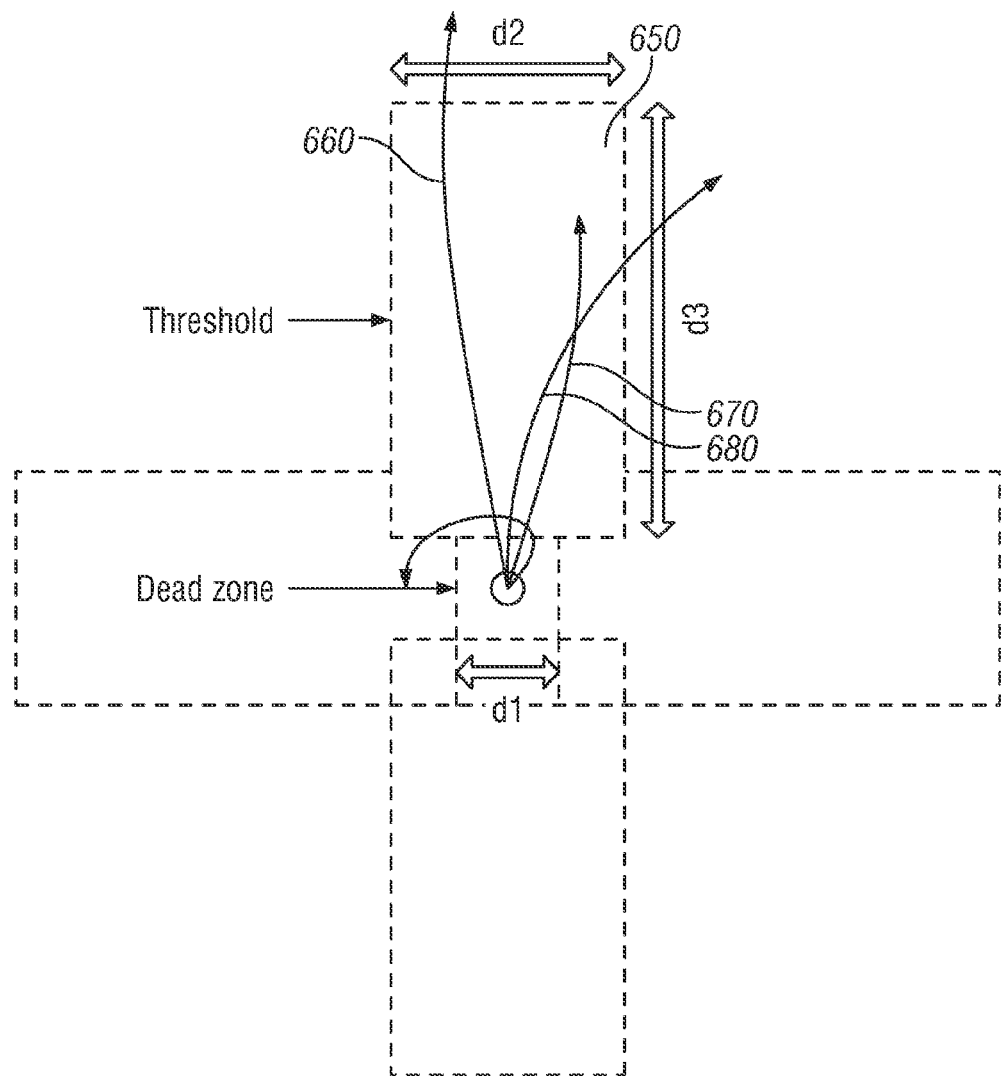
FIG. 6 shows one illustrative example of how a locking threshold may be established to lock the direction of scroll in a single direction.
Figure 7:
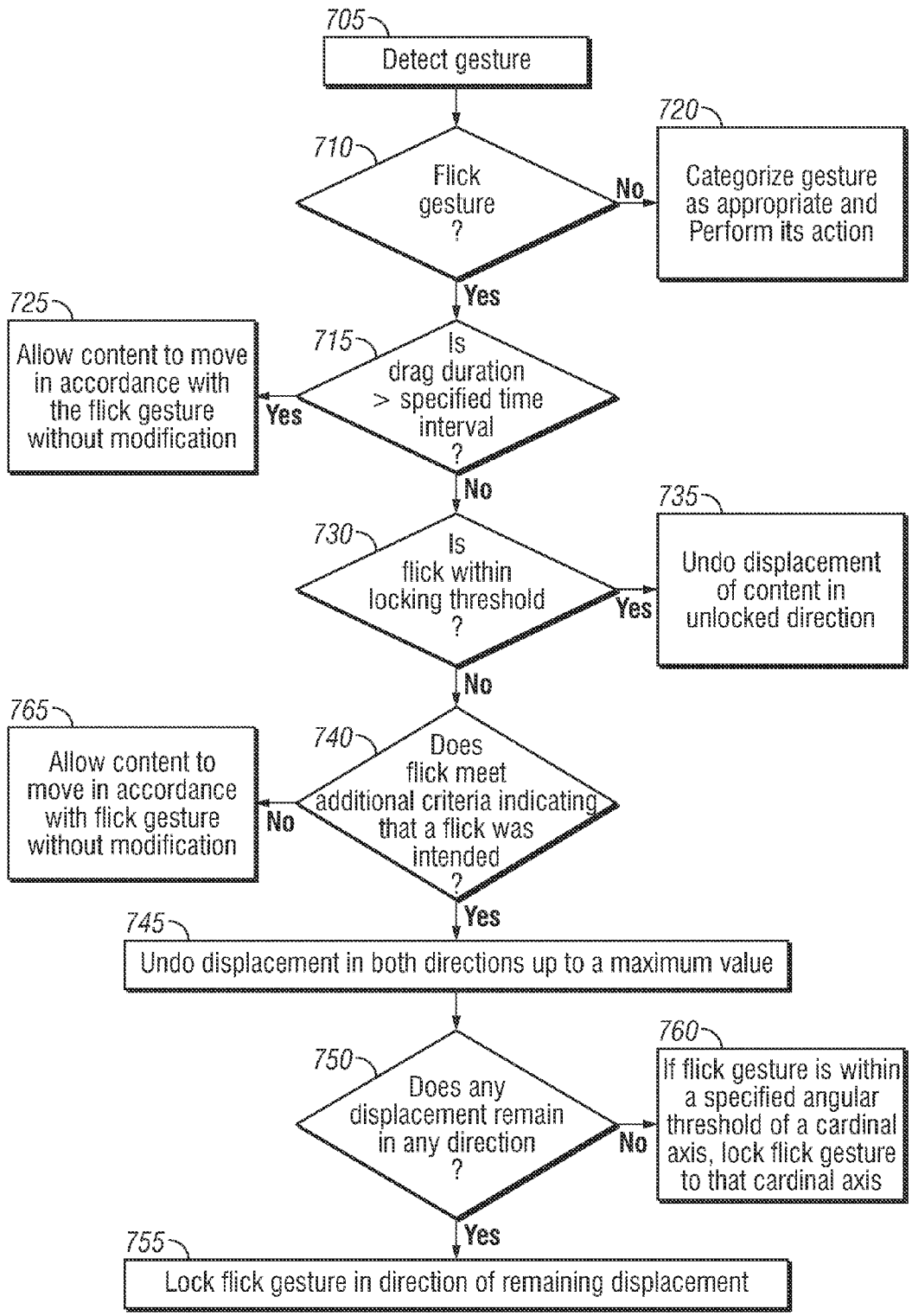
FIG. 7 is flowchart illustrating one example of how additional criteria may be employed to determine if a flick gesture is a flick that is intended by the user to cause the page to scroll so that it is locked in one of the cardinal directions.

FIG. 6 shows one illustrative example of how a locking threshold as described above may be established. In this example the input device is initially within the small square denoted the dead zone and will scroll upward along one of three paths 660, 670 and 680. A threshold area 650 is established above the location of the input device 408. The boundaries of the threshold area 650 are denoted by the dashed rectangle, which has a length d3 and a width d2. The length and width may be specified in terms of the number of physical pixels they encompass. For instance, in one particular example, the length d3 may be equal to 100 physical pixels and the width d3 may be equal to 25 physical pixels.

As the input device moves within the threshold area 650 to initiate a touch gesture, the scrolling of the content will be locked in the vertically upward direction provided that it stays within the threshold area for a certain distance, which in this example is d3. If the touch gesture does not meet this threshold criterion, scrolling remains unlocked. Accordingly, in this example, touch gesture 660 causes the direction of the scroll to be locked, whereas touch gestures 670 and 680 leave the scroll direction unlocked so that the page is moved in two dimensions.

In some cases the use of fixed thresholds such as those described above is not adequate to identify the user's intent to scroll content in a cardinal direction. This can be a particular problem, for instance, when the user is operating and holding a mobile device with one hand and scrolls using the thumb as the input device. In this case the touch gesture performed by the thumb may follow the path 680 shown in FIG. 6. As a result the touch gesture will not be properly disambiguated based on the established locking criteria.

To overcome this problem, additional criteria may be employed under specific conditions to determine if a touch gesture is a flick that is intended by the user to cause the page to scroll so that it is locked in one of the cardinal directions. One example of such additional criteria will be illustrated with reference to the flowchart of FIG. 7. In this example a touch gesture is detected at step 705 and proceeds to step 710, in which the gesture is classified as a flick gesture or a non-flick gesture in accordance with whatever criteria have been previously established. For instance, in one particular implementation the last portion of the gesture (e.g., the last 100 msec of the gesture) is examined. If during this portion of the gesture its speed is greater than a minimum threshold (e.g., 200 pixels/sec), the touch gesture will be interpreted as a flick and the process will proceed to decision step 715. If during this portion of the gesture its speed is less than the minimum threshold, the touch gesture will be interpreted at step 720 in accordance with criteria that have been established for other types of gestures.

If the gesture has been interpreted as a flick at decision step 710 so that the process proceeds to decision step 715, and the duration of the drag is greater than some specified time interval (e.g., 200 msec), the process will proceed to step 725. In step 725 the gesture will be assumed to accurately represent the user's intent and the content will move in accordance with the gesture without undergoing any modification. If, on the other hand, the duration of the drag is less than the specified time period, the user's intent is less certain, in which case additional criteria will be imposed on the flick. First, the process proceeds from step 715 to decision step 730, where the movement of the flick is examined to determine if it remains within the pre-established locking threshold. The locking threshold may be established in any desired manner, one example of which is illustrated above in connection with FIG. 6.

Figure 8:
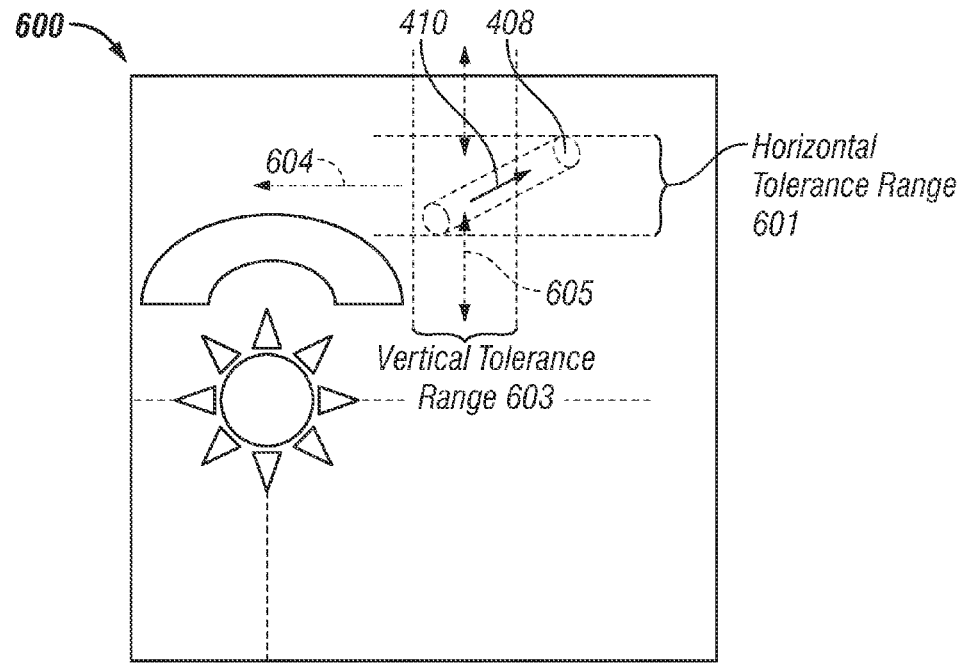
FIG. 8 shows an example of content included on a page presented on touch-sensitive display.
Figure 9:
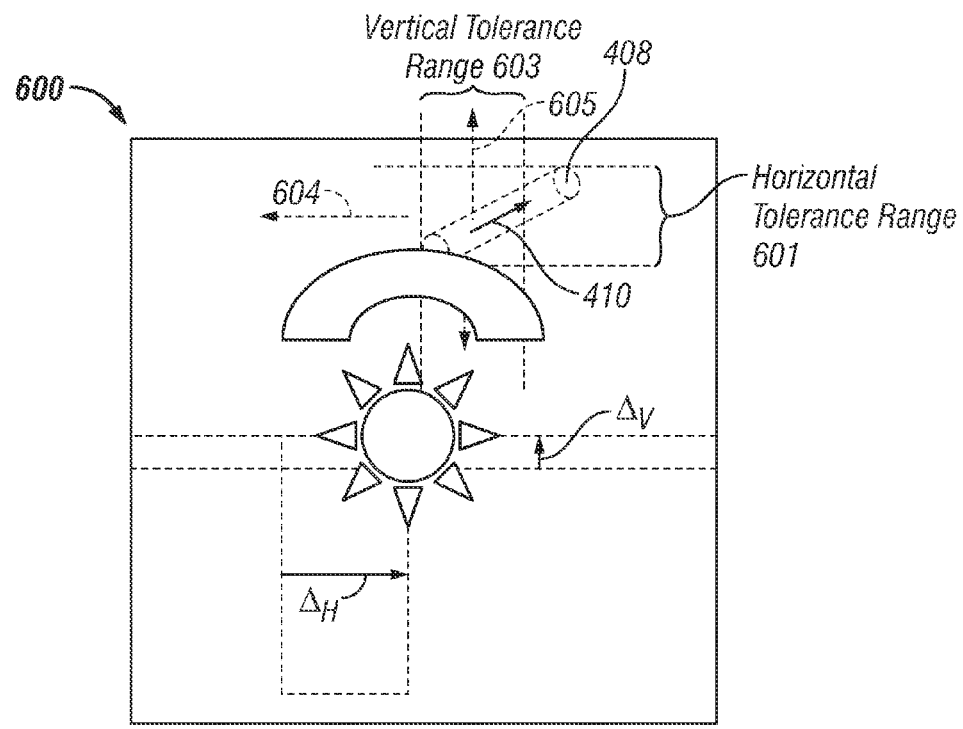
FIG. 9 shows the page of FIG. 8 after the content has been displaced by a flick in a direction both upward and to the right.
Figure 10:
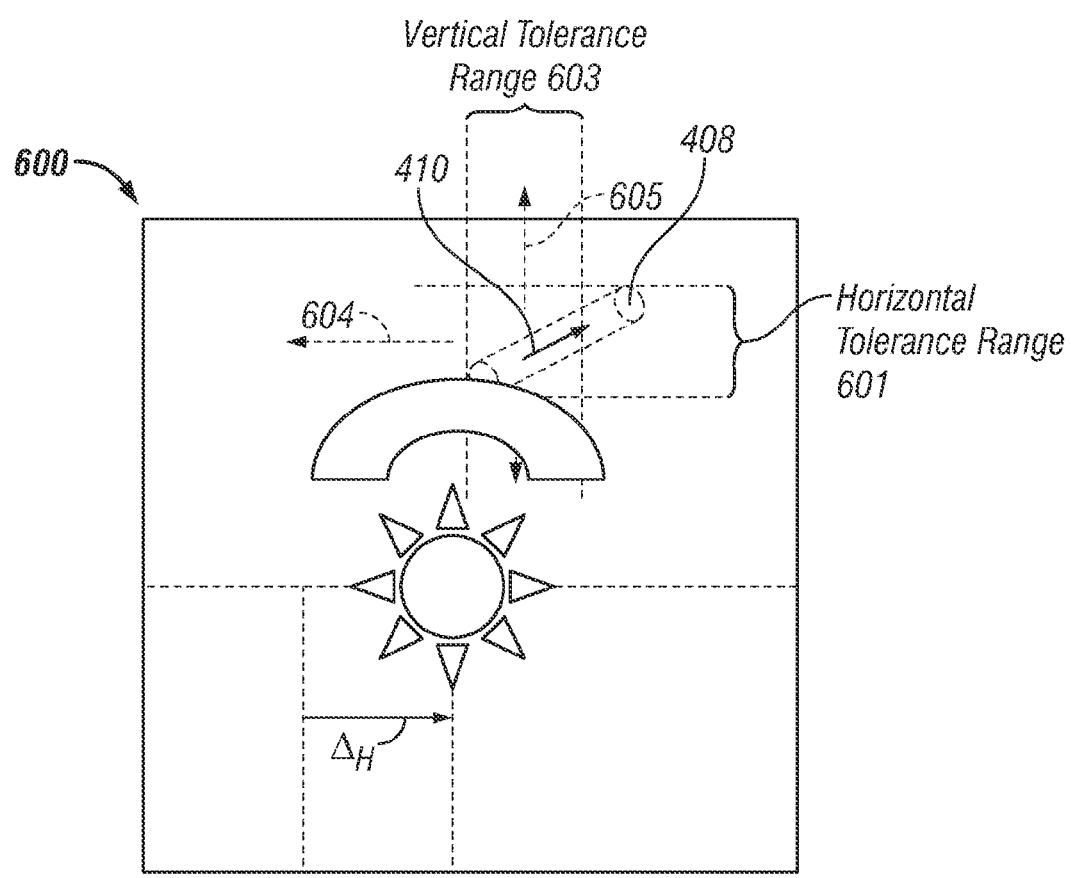
FIG. 10 shows the page of FIG. 9 after it has been determined that the movement should be locked in the horizontal direction.

If the flick is determined to satisfy the locking threshold in decision step 730, the process proceeds to step 735, where the content is scrolled in the locked direction (e.g., a cardinal direction) and any displacement of the content that has occurred as a result of the flick in the other, orthogonal direction is undone. For instance, assume the content shown in FIG. 8 is displaced by a flick in a direction both upward and to the right (i.e., toward the upper right-hand corner) so that the content is displaced a distance ΔH in the horizontal direction and a distance ΔV in the vertical direction (see FIG. 9). Also assume that in step 730 it has been determined that the movement should be locked in the horizontal direction, then in step 735 the distance ΔV that the content has been displaced in the vertical direction is undone so that the content returns to its vertical position prior to the flick. This is shown in FIG. 10, where the content has moved by a distance ΔH relative to its location in FIG. 8 but has returned to its vertical position in FIG. 8 so that ΔV is zero.

If the flick does not satisfy the locking threshold in decision step 730, the process proceeds to step 740, where the flick is further analyzed to determine if in fact it is a flick gesture that is intended to scroll the content in a single direction. This analysis is made by determining if the flick satisfies one or more additional criteria. In this particular example the addition criterion applied in step 740 is whether the speed of the flick exceeds a threshold amount. This threshold amount (e.g., 1500 pixels/sec) may be significantly greater than the minimum threshold speed that was applied in step 710 to initially determine if the touch gesture was a flick. If the flick does not exceed this speed, then in step 765 the content is allowed to be dragged in the direction of the flick without undergoing any modification.

If, on the other hand, at decision step 740 the flick is found to exceed this speed, the intent of the flick is more likely to be to scroll the content in a single direction than if the speed is below this threshold. Accordingly, if the flick exceeds the threshold, any displacement of the content, up to a maximum amount, which has occurred as a result of the flick in either cardinal direction is undone in step 745. The maximum displacement that is undone is kept relatively small (e.g., 50 pixels) so that it is not an abrupt and perceivable jump to the user. Additionally, if there is any remaining displacement above and beyond the maximum displacement which has been undone in either cardinal direction, as determined in decision step 750, the flick is treated as if the user intended to scroll the content in that direction. Accordingly, the flick is locked in that direction in step 755. Stated differently, if any remaining displacement in one of the directions exceeds some minimum amount (e.g., 50 pixels), then in step 750 the flick will be locked in that direction. On the other hand, if the flick is not locked at decision step 750, but is within some specified angular threshold of one of the cardinal axis, the flick is snapped and locked to that cardinal axis in step 760. For instance, the angular threshold may be +/−35°. If the flick is outside of the angular threshold, the content is allowed to be dragged in the same angular direction as the flick.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of operating a device having a touch-sensitive display, comprising:
   displaying scrollable information elements on the touch-sensitive display;
   detecting a touch gesture from an input device on the touch-sensitive display and a speed associated with the touch gesture;
   classifying the touch gesture as a flick gesture, wherein the touch gesture is classified as a flick gesture in the classifying step if the touch gesture exceeds a first minimum speed, wherein:
   if the flick gesture satisfies at least a first criterion reflecting a user intent to scroll the information elements in a single direction along a first of a pair of cardinal axes, locking a direction in which the information elements are scrolled along the single direction; and
   if the flick gesture satisfies the first criterion, undoing any displacement of the information elements which has occurred along a second of the cardinal axes orthogonal to the first cardinal axis as a result of classifying the touch gesture as a flick gesture,
      wherein if the flick gesture does not satisfy the first criterion, determining if the flick gesture satisfies at least a second criterion further indicating that the user intent is to scroll the information elements in a single direction,
      wherein the second criterion is a second minimum speed that the flick gesture is to exceed, the second minimum speed greater than the first minimum speed.

2. The method of claim 1 wherein the first criterion includes a pre-established locking threshold area on the touch-sensitive display within which at least a first portion of the flick remains.

3. The method of claim 1 wherein the first criterion is only applied if the flick gesture has a duration less than a first specified period of time.

4. The method of claim 1 wherein, if the second criterion is satisfied, undoing the displacement of the information elements which has occurred along at least the second of the cardinal axes as a result of classifying the touch gesture as a flick gesture.

5. The method of claim 4 wherein, if a direction of the flick is within a prescribed angular threshold of one of the cardinal axes, locking the direction along which the information elements are scrolled along that cardinal axis.

6. The method of claim 1 wherein, if the second criterion is satisfied and the displacement of the information elements which has occurred along one of the cardinal axes as a result of classifying the touch gesture as a flick gesture exceeds a minimum value, locking the direction in which the information elements are scrolled along said one of the cardinal axes.

7. One or more computer-readable storage media, not comprising a propagated signal, storing instructions executable by a computing system, to perform a method for determining if a touch gesture on a touch-sensitive display is intended to cause content to scroll, the method comprising the steps of:
   categorizing a touch gesture as a flick gesture if it satisfies at least a first criterion;
   determining if the flick gesture satisfies a locking threshold in which the flick gesture remains within a threshold area on the display for a minimum travel distance and, if the locking threshold is satisfied, locking the flick gesture so that it causes content presented on the display to be scrolled in a single dimension; and
   if the flick gesture fails to satisfy the locking threshold, confirming that the flick gesture is intended to scroll in a single direction if it satisfies at least a second criterion greater than the first criterion.

8. The computer-readable storage media of claim 7 wherein, if the flick gesture satisfies the locking threshold, causing any displacement of the content on the display in a second dimension to be undone so that the content scrolls only in the single dimension.

9. The computer-readable storage media of claim 8 wherein only a displacement up to a maximum specified value is undone.

10. The computer-readable storage media of claim 7 wherein the single dimension is along a cardinal axis.

11. The computer-readable storage media of claim 7 wherein the touch gesture is categorized as a flick gesture in the step of categorizing a touch gesture as a flick gesture if the touch gesture exceeds a first minimum speed and wherein the second criterion is a second minimum speed that the flick gesture is to exceed, wherein the second minimum speed is greater than the first minimum speed.

12. The computer-readable storage media of claim 7 wherein, if the locking threshold is satisfied and a direction of the flick gesture is within a prescribed angular threshold of the single dimension, locking the direction along which the content is scrolled on the touch-screen display.

13. A computing device, comprising:
   a touch-sensitive display configured to
   display a scrollable informational elements on the touch-sensitive display;
   a gesture response mechanism configured to detect a first touch gesture over the scrollable informational elements on the touch-sensitive display;
   a processing unit and memory operable to:
      classify the touch gesture as a flick gesture;
      if the flick gesture satisfies at least a first criterion reflecting a user intent to scroll the informational elements in a single direction along a first of a pair of axes, lock a direction in which the information elements are scrolled along the single direction and
      undo any displacement of the information elements which has occurred along a second of the axes orthogonal to the first axis as a result of classifying the touch gesture as a flick gesture, and
      if the flick gesture does not satisfy the first criterion, determine if the flick gesture satisfies at least a second criterion further indicating that the user intent is to scroll the information elements in a single direction, wherein the second criterion is a minimum speed that the flick gesture is to exceed.

14. The computing device of claim 13 wherein, if the second criterion is satisfied, the processing unit and memory are further operable to undo the displacement of the information elements which has occurred along at least the second of the cardinal axes as a result of classifying the touch gesture as a flick gesture indicating that the user intent is to scroll the information elements in a single direction.

15. The computing device of claim 14 wherein, if a direction of the flick is within a prescribed angular threshold of one of the cardinal axes, the processing unit and memory are further operable to lock the direction along which the information elements are scrolled along that cardinal axis.

* * * * *